United States Patent
Kurihara (10) Patent No.: US 8,643,870 B2
(45) Date of Patent: Feb. 4, 2014

(54) PRINTING CONTROL APPARATUS, PRINTING CONTROL METHOD, PROGRAM, AND STORAGE MEDIUM

(75) Inventor: Shukei Kurihara, Yokohama (JP)

(73) Assignee: Canon Kabushiki Kaisha (JP)

( * ) Notice: Subject to any disclaimer, the term of this patent is extended or adjusted under 35 U.S.C. 154(b) by 846 days.

(21) Appl. No.: 12/140,250

(22) Filed: Jun. 16, 2008

(65) Prior Publication Data

US 2008/0316530 A1   Dec. 25, 2008

(30) Foreign Application Priority Data

Jun. 22, 2007   (JP) .................................. 2007-165313

(51) Int. Cl.
*G06F 3/12* (2006.01)

(52) U.S. Cl.
USPC .......................................................... 358/1.15

(58) Field of Classification Search
USPC ......................................... 358/1.15; 385/1.15
See application file for complete search history.

(56) References Cited

U.S. PATENT DOCUMENTS

| | | | | |
|---|---|---|---|---|
| 7,236,260 | B2 * | 6/2007 | Ohta | 358/1.15 |
| 2001/0043724 | A1 * | 11/2001 | Hines | 382/114 |
| 2002/0030840 | A1 * | 3/2002 | Itaki et al. | 358/1.13 |
| 2003/0095279 | A1 * | 5/2003 | Kim | 358/1.14 |
| 2003/0175061 | A1 * | 9/2003 | Shiragami | 400/76 |
| 2005/0128512 | A1 * | 6/2005 | Kurotsu | 358/1.15 |
| 2005/0219612 | A1 * | 10/2005 | Nakagawa | 358/1.15 |
| 2007/0008579 | A1 * | 1/2007 | Kawasaki | 358/1.15 |

FOREIGN PATENT DOCUMENTS

JP   2007-11469 A   1/2007

* cited by examiner

*Primary Examiner* — Marivelisse Santiago Cordero
*Assistant Examiner* — Mesfin Getaneh
(74) *Attorney, Agent, or Firm* — Rossi, Kimms & McDowell LLP (57) ABSTRACT

A printing control apparatus includes a spooler which spools a received print job in a print queue and outputs the print job, a print job management unit which holds a print job output from the spooler, and manages transmission of a print job to a printing apparatus and whether a print job is complete in the printing apparatus, and a display control unit which displays the processing status of a print job that is spooled in the print queue and managed by the print job management unit.

9 Claims, 10 Drawing Sheets

PRINTING CONTROL APPARATUS, PRINTING CONTROL METHOD, PROGRAM, AND STORAGE MEDIUM

BACKGROUND OF THE INVENTION

1. Field of the Invention

The present invention relates to a printing control technique.

2. Description of the Related Art

There is known a printing system which prints on a paper medium by transmitting a print job generated by a host computer to a printer and processing it by the printer. In the printing system, for example, when the user designates printing, the Microsoft OS "Windows®" allows him to view the processing status of a print job through the graphical user interface of the print queue. The user can know whether the print job has been queued in the print queue and output from the print queue.

Even if the user can know that a print job has been output from the print queue, he cannot know whether processing of the print job is complete. For example, the user cannot know, from the print queue, the status of print processing such as rendering or the end of the print processing for a print job output from the print queue.

Further, once a print job is queued, the settings (print job settings) of the print job such as the copy count cannot be changed.

As a solution to these problems, Japanese Patent Laid-Open No. 2007-11469 discloses a job monitoring technique using a language monitor. Japanese Patent Laid-Open No. 2007-11469 discloses a configuration which makes an output from the print queue coincide with an actual printout. In this configuration, as print job monitoring processing, until processing of a print job is complete, the language monitor notifies the print queue that transmission is not complete even if the transmission is complete.

There is also proposed a method of displaying job information held in a language monitor by a status display application. However, the user must check both the print queue and application in order to check or operate a print job. This operation is complicated.

In Japanese Patent Laid-Open No. 2007-11469, the display of a print job is limited to a job requiring monitoring processing, so a list of print jobs cannot be displayed. In addition, Japanese Patent Laid-Open No. 2007-11469 does not mention change of the settings of a queued print job.

SUMMARY OF THE INVENTION

It is an object of the present invention to provide a printing control technique capable of displaying print job information and reflecting the operation of a print job in print job processing till the completion of print processing by a printing apparatus even after the spooler transmits the print job.

According to one aspect of the present invention, there is provided a printing control apparatus which uses a spooler that spools a received print job, and a display control unit that displays a processing status of the print job, the apparatus comprising a print job management unit adapted to hold a print job output from the spooler, and manage transmission of a print job to a printing apparatus and whether a print job is complete in the printing apparatus, wherein when transmission of a print job from the print job management unit to the printing apparatus is complete, the print job management unit outputs a transmission completion notification to the spooler, when the print job management unit accepts from the printing apparatus a notification that processing of the print job is complete, the print job management unit outputs a printing completion notification to the spooler, and the display control unit controls display of the processing status on the basis of the transmission completion notification and printing completion notification accepted by the spooler.

According to another aspect of the present invention, there is provided a printing control method for a printing control apparatus which uses a spooler that spools a received print job, and a display control unit that displays a processing status of the print job, the method comprising a print job management step of causing a print job management unit to hold a print job output by processing in a spool step, and manage transmission of a print job to a printing apparatus and whether a print job is complete in the printing apparatus, wherein when transmission of a print job to the printing apparatus is complete by processing in the print job management step, a transmission completion notification is output to the spooler in the print job management step, when a notification that processing of the print job is complete is accepted from the printing apparatus in the print job management step, a printing completion notification is output to the spooler in the print job management step, and the display control unit controls display of the processing status on the basis of the transmission completion notification and printing completion notification accepted by the spooler.

According to the present invention, print job information can be displayed, and the operation of a print job can be reflected in print job processing till the completion of print processing by a printing apparatus even after the spooler transmits the print job.

Further features of the present invention will become apparent from the following description of exemplary embodiments (with reference to the attached drawings).

DESCRIPTION OF THE EMBODIMENTS

Preferred embodiments of the present invention will be exemplified in detail below with reference to the accompanying drawings. Components set forth in these embodiments are merely examples. The technical scope of the present invention should be determined by the appended claims and is not limited to the individual embodiments to be described below.

First Embodiment (Hardware Configurations of Information Processing Apparatus and Printing Apparatus)

The configurations of an information processing apparatus (host computer) and printing apparatus suitable for the first embodiment will be described with reference to FIGS. 1 and 2. The first embodiment will exemplify a laser beam printer as the printing apparatus. However, the gist of the present invention is not limited to the following example, and is also applicable to a printing apparatus of another printer type such as the inkjet type.

Figure 1:
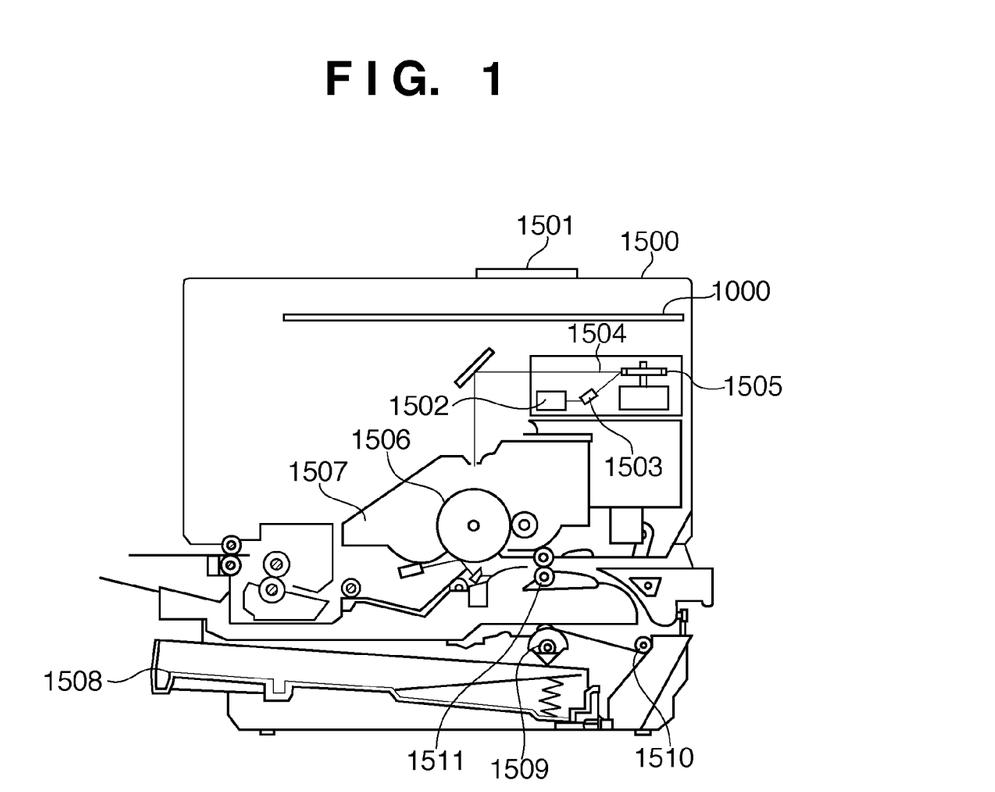
FIG. 1 is a sectional view showing the structure of a laser beam printer as an example of a printing apparatus.

FIG. 1 is a sectional view showing the structure of a laser beam printer (LBP) as an example of the printing apparatus.

A printing apparatus 1500 (to be also referred to as an LBP 1500 hereinafter) can accept input of a print job (e.g., print information (character codes or the like), form information, or macro instruction) supplied from a host computer, and store the print job. Based on the print job, the LBP 1500 can generate a corresponding character pattern, form pattern, or the like, and form an image on a print sheet serving as a print medium.

An operation unit 1501 has switches, an LED display, and the like for operating the printing apparatus 1500. A printer control unit 1000 controls the LBP 1500, and analyzes character information and the like supplied from the host computer. The printer control unit 1000 mainly converts the character information into a video signal of a corresponding character pattern, and outputs the video signal to a laser driver 1502. The laser driver 1502 is a circuit for driving a semiconductor laser 1503. In accordance with the input video signal, the laser driver 1502 switches between the ON and OFF states of a laser beam 1504 emitted from the semiconductor laser 1503.

The laser beam 1504 is horizontally oscillated by a rotating polygon mirror 1505 to scan and expose the surface of an electrostatic drum 1506. As a result, the electrostatic latent image of the character pattern is formed on the electrostatic drum 1506. The latent image is developed by a developing unit 1507 arranged around the electrostatic drum 1506, and transferred onto a print sheet. Cut sheets are used as the print sheets, and stored in a paper cassette 1508 mounted in the LBP 1500. A print cut sheet is fed into the apparatus by a feeding roller 1509 and conveyance rollers 1510 and 1511, and supplied to the electrostatic drum 1506. The LBP 1500 comprises at least one card slot (not shown) to connect an optional font card or a control card (emulation card) of a different language system in addition to a built-in font. The LBP 1500 further comprises a hard disk (not shown) to store font data or download the contents of the optional font card or those of the control card (emulation card) of a different language system.

Figure 2:
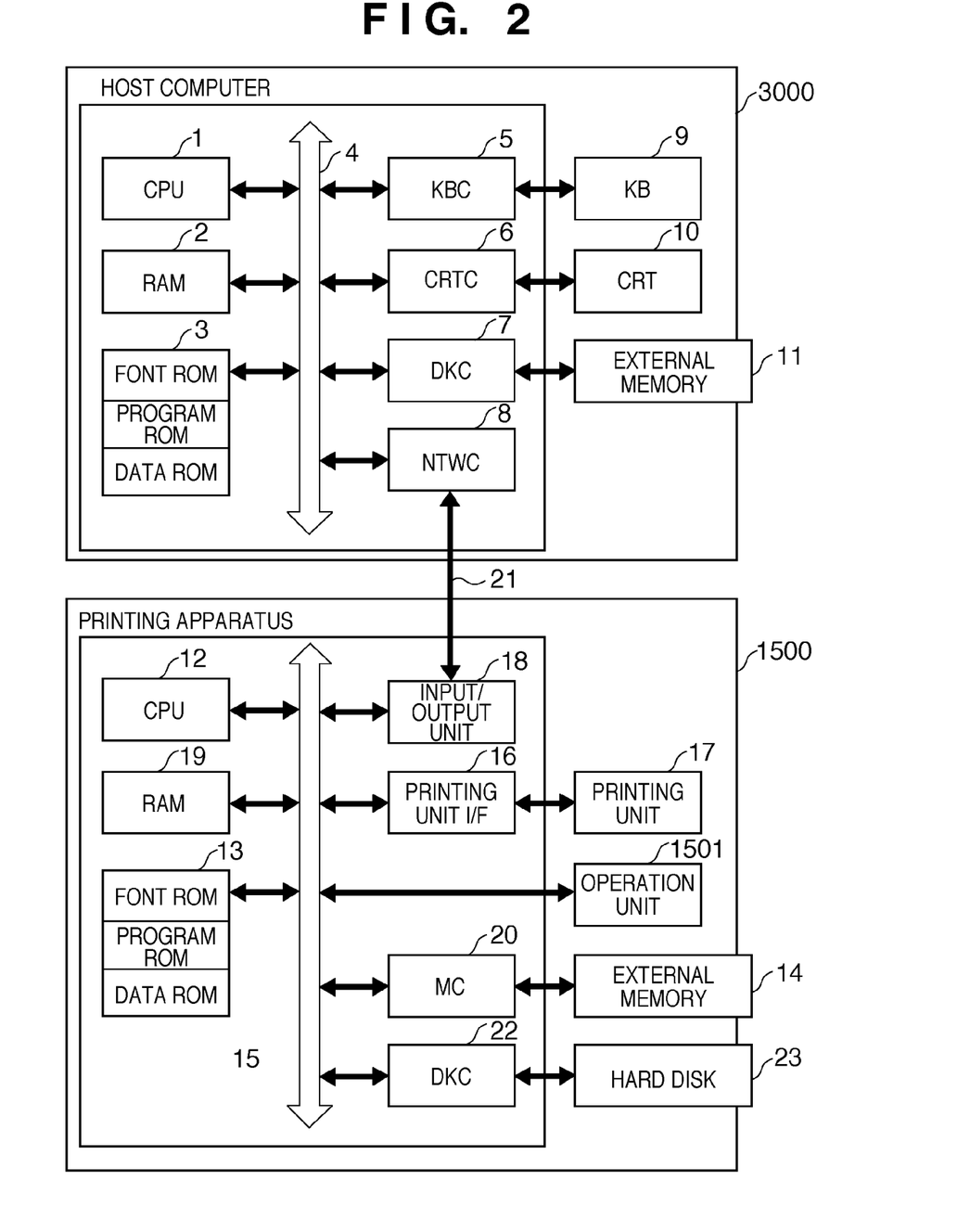
FIG. 2 is a block diagram for explaining the configurations of a host computer and printing apparatus.

FIG. 2 is a block diagram for explaining the configurations of the host computer and printing apparatus. The host computer and the laser beam printer (FIG. 1) serving as the printing apparatus will be exemplified.

A host computer 3000 comprises a CPU 1 which processes a document containing a figure, image, text, and table (including a spreadsheet) on the basis of a document processing program and the like stored in the program ROM of a ROM 3. The CPU 1 comprehensively controls each device connected to a system bus 4.

The program ROM of the ROM 3 stores programs such as a control program for the CPU 1 and programs for a printer selector and network printer driver according to the embodiment of the present invention. The font ROM of the ROM 3 stores font data and the like used in document processing. The data ROM of the ROM 3 stores various data used to perform document processing and the like.

A RAM 2 functions as a main memory and work area for the CPU 1. The RAM 2 also functions as a storage device for storing a printer management table according to the embodiment of the present invention, a printer layout registration list (not shown) copied from an external storage device, and the like. A keyboard controller (KBC) 5 controls a key input from a keyboard 9 or a pointing device (not shown). A CRT controller (CRTC) 6 controls display on a CRT display (CRT) 10.

An external memory controller (DKC) 7 controls access to an external memory 11. For example, the external memory 11 stores a boot program, various applications, font data, user files, edit files, and the like. The external memory 11 is, e.g., a hard disk (HD), floppy disk (FD) or flash EEPROM. A network controller (NTWC) 8 is connected to the printing apparatus 1500 via a bidirectional interface 21, and executes communication control processing with the printing apparatus 1500. For example, the CPU 1 enables WYSIWYG on the CRT 10 by rasterizing an outline font in a display information RAM set in the RAM 2. The CPU 1 opens various registered windows and executes various data processes on the basis of commands designated with a mouse cursor (not shown) or the like on the CRT 10.

A CPU 12 controls the operation of the printing apparatus 1500. The CPU 12 executes a control program and the like stored in the program ROM of a ROM 13, and a control program and the like stored in an external memory 14. The CPU 12 comprehensively controls various devices connected to a system bus 15 on the basis of a control program. The CPU 12 outputs an image signal as output information to a printing unit (printer engine) 17 connected via a printing unit interface 16.

The font ROM of the ROM 13 stores font data and the like used to generate the output information. When the printing apparatus does not have an external storage device such as a hard disk 23, the data ROM of the ROM 13 stores various types of feature information used in the host computer.

The CPU 12 can communicate with the host computer 3000 via an input/output unit 18, and can notify the host computer 3000 of information and the like in the printing apparatus 1500. A RAM 19 functions as a main memory, work area, and the like for the CPU 12. The RAM 19 can increase its memory capacity by an optional RAM connected to an expansion port (not shown). The RAM 19 is available as an output information rasterization area, environment data storage area, NVRAM, and the like.

A disk controller (DKC) 22 controls access to the hard disk (HD) 23, and a memory controller (MC) 20 controls access to the external memory 14 such as an IC card. The external memory 14 is connectable as an option to the printing apparatus 1500, and stores font data, an emulation program, form data, and the like. An operation unit 1501 has switches, an LED display, and the like for operating the printing apparatus 1500.

(Functional Configurations of Information Processing Apparatus and Printing Apparatus)

Figure 3:
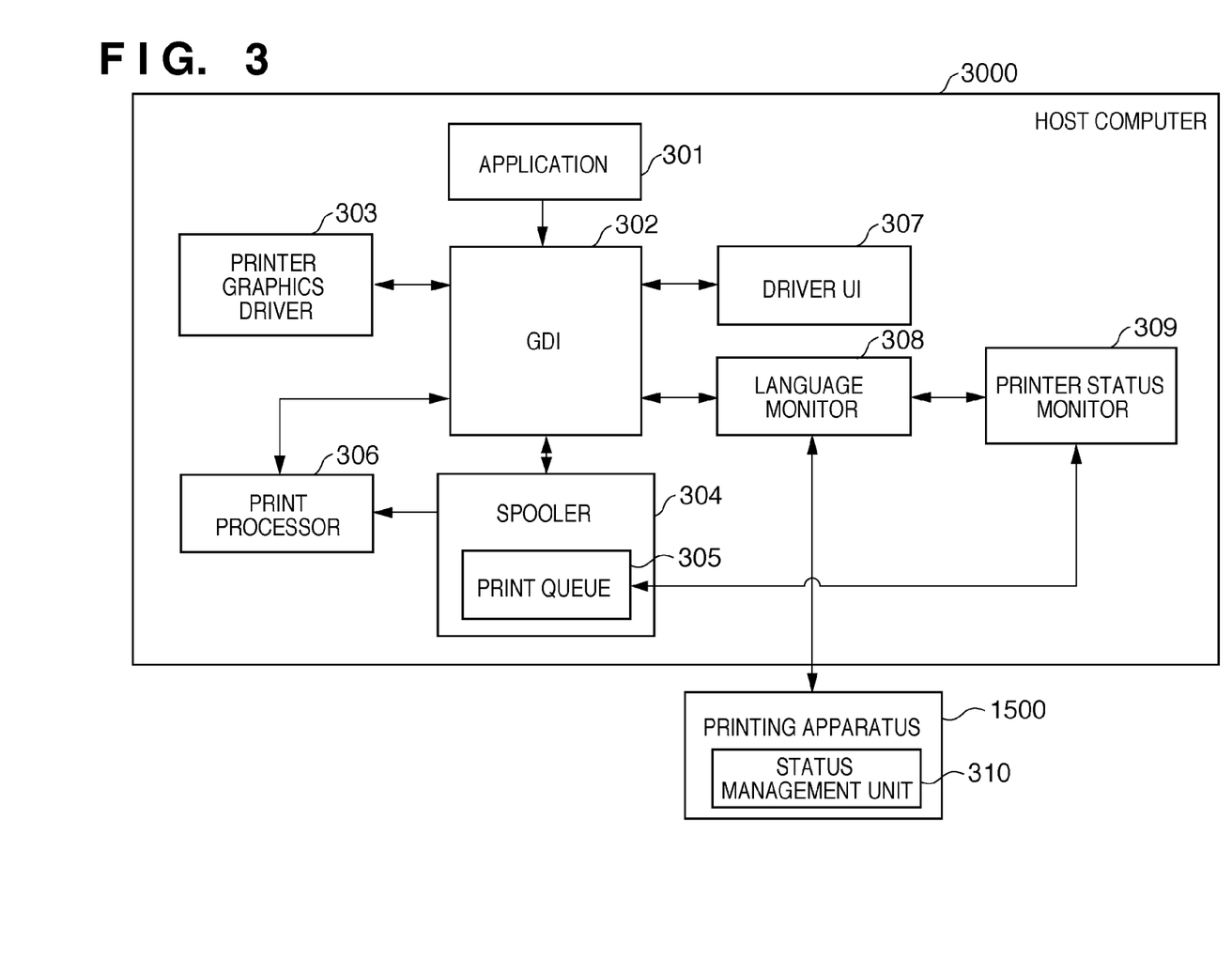
FIG. 3 is a block diagram for explaining the functional configurations of the host computer and printing apparatus.

FIG. 3 is a block diagram for explaining the functional configurations of the host computer 3000 and printing apparatus 1500. Assume that the operating system (to be referred to as an OS hereinafter) is Microsoft Windows® in the host computer 3000 of FIG. 3. The printing apparatus 1500 is connected to the host computer 3000 so that it can communicate with a language monitor 308.

The printing apparatus 1500 comprises a status management unit 310. The status management unit 310 can manage, as statuses, the current status of the printing apparatus 1500 and the status of a print job in process. The status management unit 310 is made up of a status detector, memory, status analyzer, communication unit, and the like (none are shown). The status management unit 310 can notify the host computer 3000 of the current status in response to a request from the host computer 3000.

An arbitrary application 301 having a print processing function is installed in the host computer 3000. Rendering data, printing of which is requested via the application 301, is transferred to a printer graphics driver 303 serving as a job output means via a graphics device interface (to be referred to as a GDI hereinafter) 302 serving as the rendering module of the OS. The printer graphics driver 303 generates a print job on the basis of the received data. The generated print job is output as a print request to the printing apparatus 1500.

The GDI 302 in the embodiment temporarily spools output data as EMF (Enhanced Meta File) data. The GDI 302 transfers the spooled data to a spooler 304 which is formed from an OS module and has a job management function.

The spooler 304 can store received print jobs in a print queue 305, and sequentially output the print jobs. The spooler 304 holds and manages information on a received job till the end of the job. As concrete management, for example, the spooler 304 manages the size and job name of a print job and the like for each printing apparatus. The print queue 305 displays the size and job name of a print job and the like for each printing apparatus. The print queue 305 displays the processing state of spool data currently held by the spooler 304. The print queue 305 is a standard function of the Windows® OS. For example, the print queue 305 can be referred to using a predetermined interface function from the printer graphics driver 303, a driver UI 307, the application 301, and the like. An entity which refers to the print queue 305 can acquire job information (queue information) currently managed in the print queue 305.

Processing after the spooler 304 receives spool data is executed separately from application processing. After the end of spooling, the spooler 304 issues a print request to a print processor 306.

Based on the issued print request, the print processor 306 reads printout information and rendering data from the spooler 304 for each page. The print processor 306 outputs each page to the printer graphics driver 303 via the GDI 302, and requests the printer graphics driver 303 to print. The print processor 306 is prepared as an OS module, but may also be customized by a printer vendor or the like.

When receiving the print request from the print processor 306, the printer graphics driver 303 renders rendering data into raster image data in accordance with the print resolution of the printer by using a GDI rendering engine which is the rendering function of the GDI 302. Then, the printer graphics driver 303 performs color processing, addition of a printer command, and the like, generates a print job, and outputs it to the printing apparatus 1500.

In practice, data output from the printer graphics driver 303 is output as a transmission request to the language monitor 308 via the GDI 302.

The language monitor 308 can divide a print job into packets of a specific size, and output them to the printing apparatus 1500. By communicating with the printing apparatus 1500, the language monitor 308 can also acquire information on the status of the printing apparatus 1500 or the processing status of a print job in process. The language monitor 308 functions as a print job management means for holding a print job output from the spooler 304, and managing transmission of a print job to the printing apparatus 1500 and whether the print job is complete in the printing apparatus 1500.

The driver UI 307 is an application or utility capable of making various settings mainly associated with a print job.

A printer status monitor 309 is a GUI capable of displaying information (job information) on the status of the printing apparatus 1500, the processing status of a print job in process, and a print job held by the language monitor 308.

Figure 4:
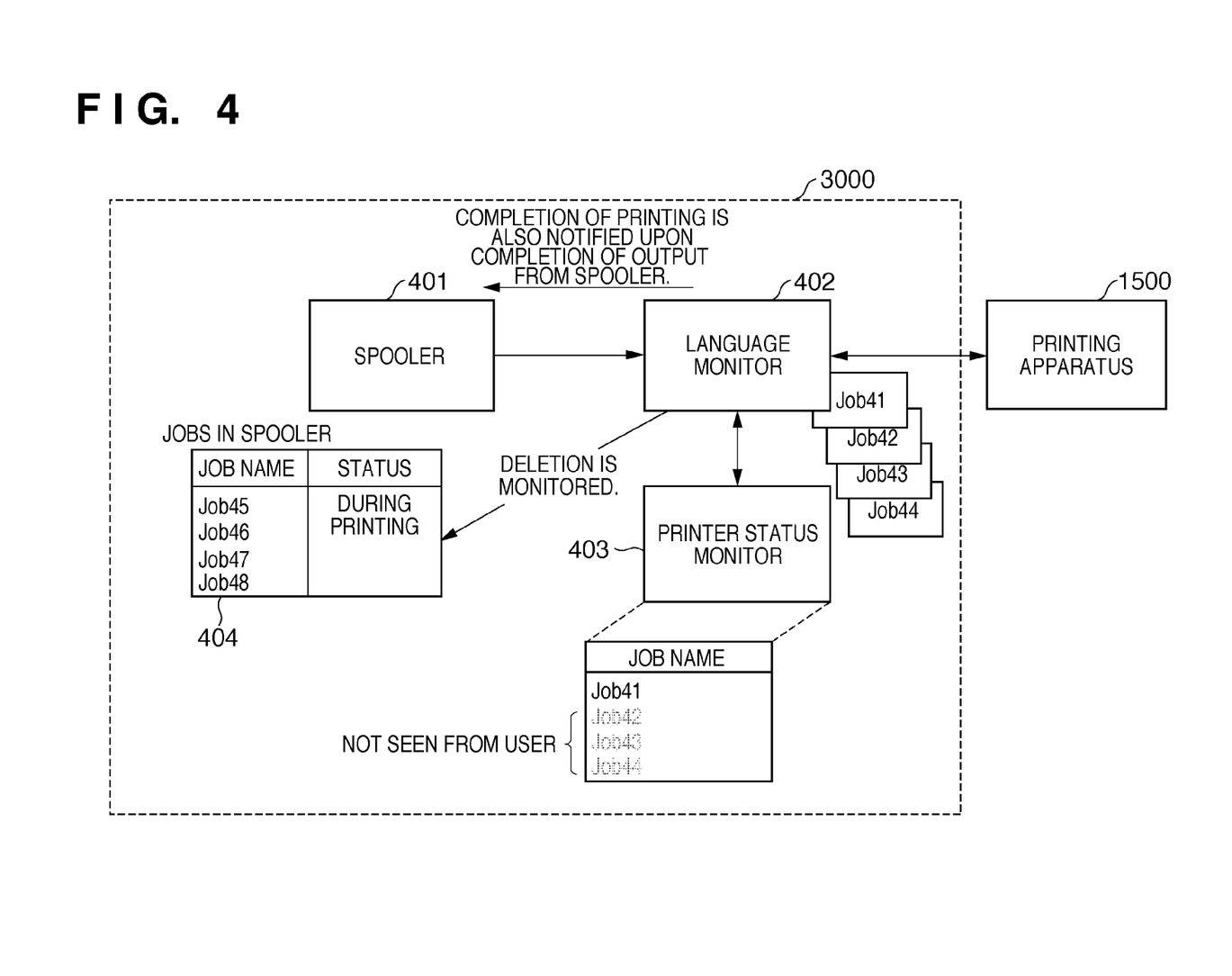
FIG. 4 is a view for explaining the operation of a conventional language monitor.

FIG. 4 is a view for explaining processing of a conventional language monitor. When a spooler 401 transfers print jobs (Job 41 to Job 44 in FIG. 4) to a language monitor 402, the language monitor 402 notifies the spooler 401 of the end of printing. In response to the printing end notification, the spooler 401 deletes the print jobs (Job 41 to Job 44) from a print queue 404.

Even if the language monitor 402 holds the print jobs, a printer status monitor 403 cannot refer to the print jobs (Job 41 to Job 44) from the print queue 404. The printer status monitor 403 can display only a print job (Job 41 in FIG. 4) which undergoes processing by the printing apparatus. Even if the language monitor 402 holds the print jobs, the user can neither check print jobs (Job 42 to Job 44) whose processing turn has not come, nor perform an operation to change their settings.

Figure 5:
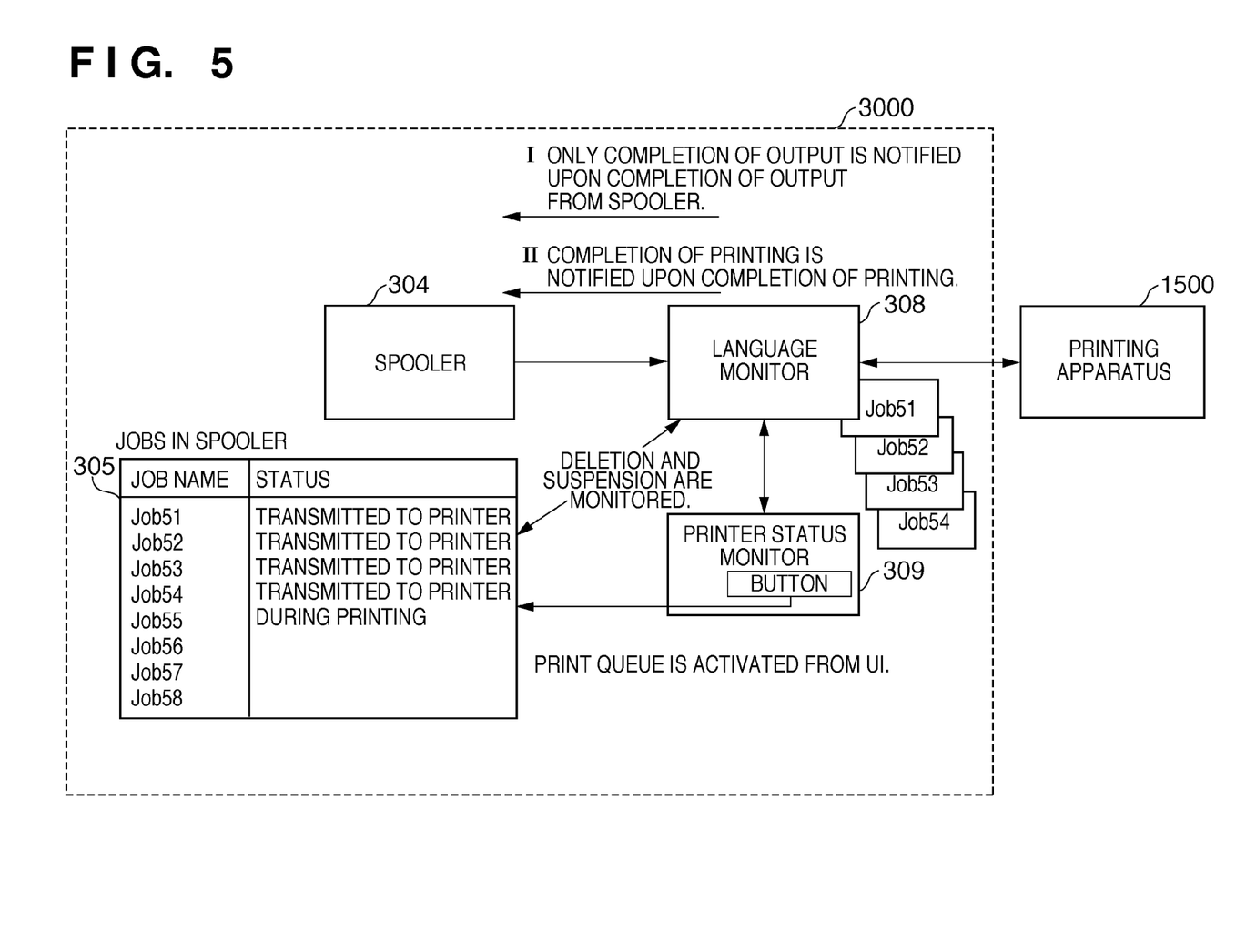
FIG. 5 is a view for explaining processing of a language monitor according to the first embodiment of the present invention.

FIG. 5 is a view for explaining processing of the language monitor according to the first embodiment. When outputting a received print job to the printing apparatus, the language monitor 308 notifies the spooler 304 of only the completion of the output. In this case, the status is displayed as "transmitted to the printer", instead of deleting print job information (job name) from the print queue 305. In FIG. 5, print jobs Job 51 to Job 54 are in the status of "transmitted to the printer". The printer status monitor 309 can display the print jobs (Job 51 to Job 54) held by the language monitor 308, the status of the printing apparatus 1500, and the processing status of a print job in process.

The language monitor 308 transmits a print job to the printing apparatus 1500, and receives information representing the processing status of the print job for each page from the printing apparatus 1500. Then, the language monitor 308 notifies the spooler 304 that printing of the print job (e.g., Job 55 in FIG. 5) is in progress. Further, the language monitor 308 transmits a print job to the printing apparatus 1500, and receives information representing the completion of printing of the print job as the status of the printing apparatus 1500 (completion of printing). Then, the language monitor 308 notifies the spooler 304 that printing is complete. In response to this, the print job information is deleted from the spooler 304.

The language monitor 308 monitors the spooler 304. When the spooler 304 performs a job operation (spooler operation) regarding suspension (interruption) or resume of a print job, the job operation can be reflected in the print job as long as the language monitor 308 holds the print job.

The print queue 305 can display print job information until the printing apparatus 1500 completes processing of a print job. Even when the spooler 304 designates a job operation such as interruption of a print job, the job operation can be reflected in processing of the print job to control execution of the print job until the processing of the print job is complete.

(Processing of Language Monitor)

Figure 6A:
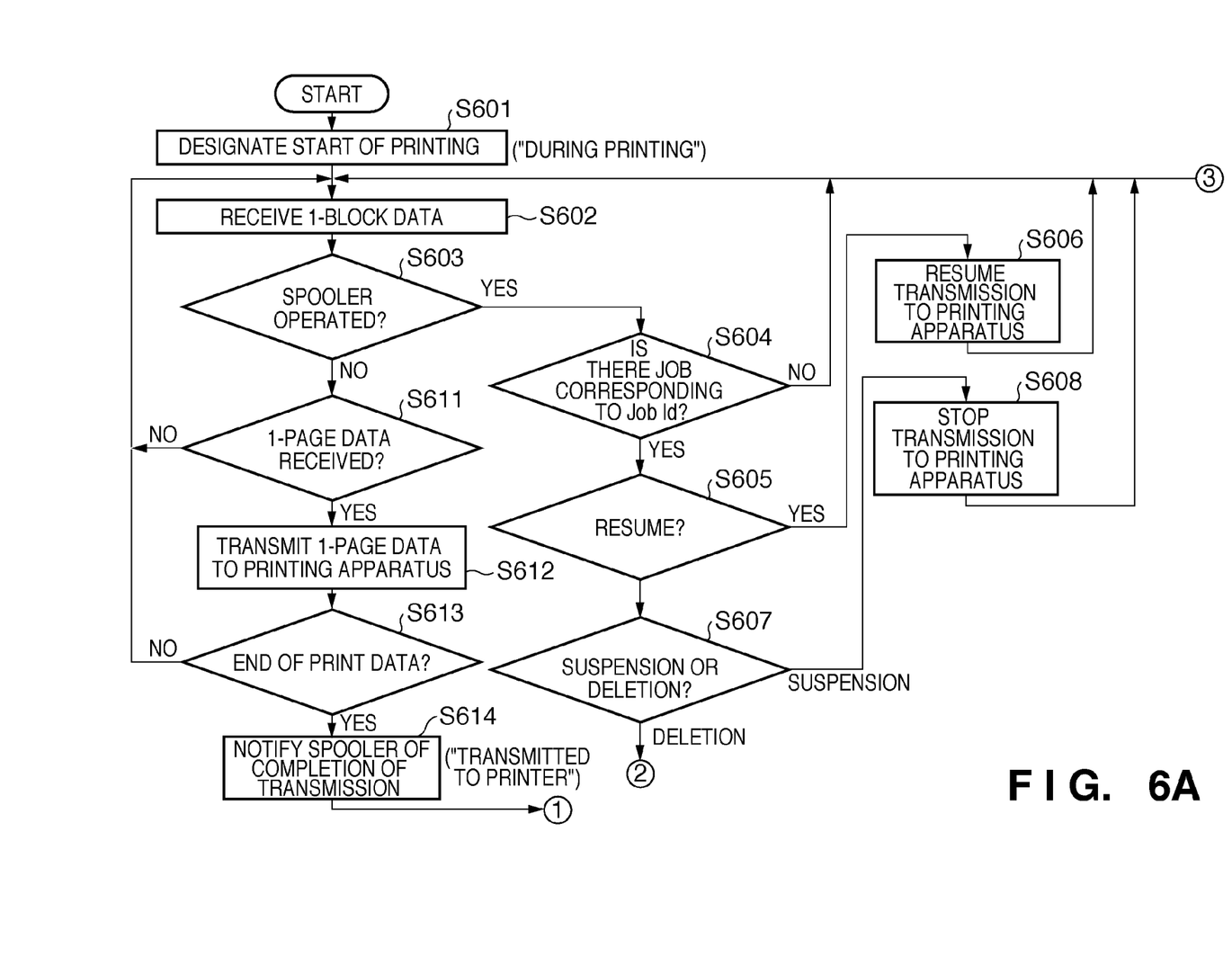
FIGS. 6A and 6B are flowcharts for explaining the processing sequence of the language monitor according to the first embodiment of the present invention.
Figure 6B:
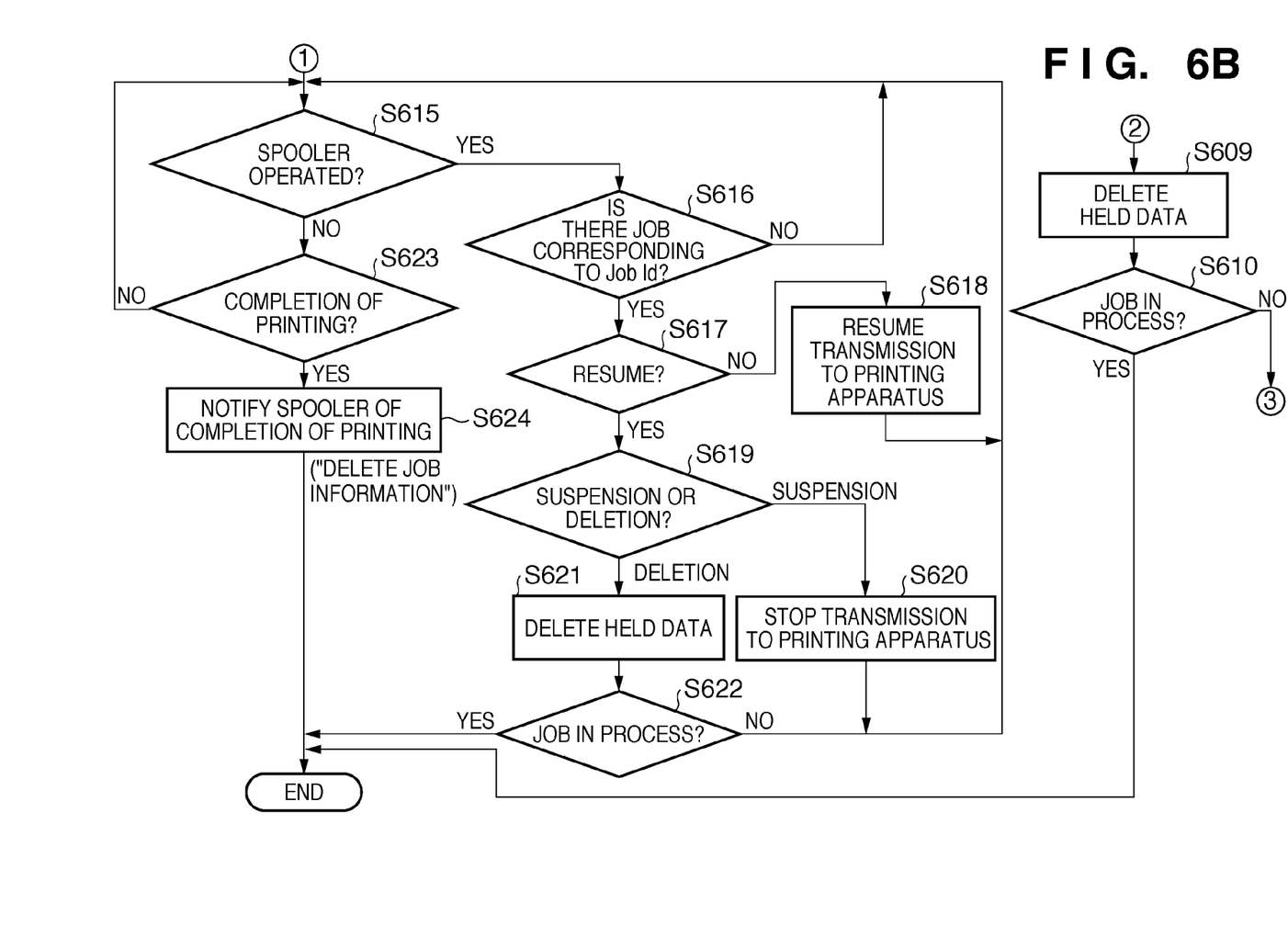

Processing of the language monitor 308 will be explained with reference to the flowcharts of FIGS. 6A and 6B. The language monitor 308 executes the processing of this flowchart under overall control of the CPU 1. The language monitor 308 has a print job identification information list (Job Id List) as a work area, and stores identification information (Job Id) of a currently held print job. The print job identification information list also stores current job identification information (Current Job Id). If there is no print job in process, the initial value is 0. By referring to identification information stored in the print job identification information list, the language monitor 308 can specify a print job held by the language monitor 308, and a print job in process by the printing apparatus 1500.

In step S601, the language monitor 308 receives a print start instruction from the spooler 304 via the GDI 302, and stores identification information (Job Id) for specifying a print job. At this time, "during printing" is displayed as the status of the print queue 305 (e.g., Job 55 in FIG. 5). Identification information (Job Id) in the print queue 305 is common to print job identification information (Job Id) held by the language monitor 308, and a print job can be specified based on the identification information (Job Id).

In step S602, the language monitor 308 receives one block of print job data from the spooler 304, and advances the process to step S603.

In step S603, the language monitor 308 determines whether the user has operated the spooler 304. Whether the user has operated the spooler 304 can be determined by calling an API prepared by the OS. At this time, a job operated from the spooler can be determined from Job Id because Job Id can be obtained by the API. If the user has operated the spooler, the language monitor 308 advances the process to step S604; if NO, to step S611.

In step S604, the language monitor 308 determines whether there is a print job corresponding to identification information (Job Id) of the operated print job. If there is a corresponding print job, the language monitor 308 advances the process to step S605; if NO, returns it to step S602.

If the language monitor 308 determines in step S605 that the operation to the spooler 304 is resumed, it advances the process to step S606; if NO, to step S607.

In step S606, the language monitor 308 resumes transmission processing of the print job to the printing apparatus 1500.

In step S607, the language monitor 308 determines whether the operation to the spooler is suspension or deletion of a job. If the operation is suspension of a job, the language monitor 308 advances the process to step S608. If the operation is deletion of a job, the language monitor 308 advances the process to step S609.

In step S608, the language monitor 308 stops transmission processing to the printing apparatus 1500, and returns the process to step S602.

In step S609, the language monitor 308 deletes print data of the print job, and advances the process to step S610.

In step S610, the language monitor 308 determines whether the deleted print job is a print job in process. If the deleted print job is a print job in process, the language monitor 308 ends the process; if NO, returns it to step S602.

In step S611, the language monitor 308 determines whether data received from the spooler 304 has reached one page. If the data has reached one page, the language monitor 308 advances the process to step S612; if NO, returns it to step S602. Data of one page contains at the end a command representing the end of page data. By determining whether the data contains this command, the language monitor 308 can determine whether it has received 1-page data.

In step S612, the language monitor 308 divides the 1-page data into blocks, and transmits them to the printing apparatus 1500.

In step S613, the language monitor 308 determines whether it has received all print data of the print job. If YES in step S613, the language monitor 308 advances the process to step S614; if NO, returns it to step S602. The print job contains at the end a command representing the end of the print job. By determining whether the print data contains this command, the language monitor 308 can determine the end of the print job.

In step S614, the language monitor 308 notifies the spooler 304 of the completion of transmitting the print job. In response to this notification, "transmitted to the printer" is displayed as the status of the print queue 305.

In step S615, the language monitor 308 determines whether the user has operated the spooler 304. If the user has operated the spooler, the language monitor 308 advances the process to step S616; if NO, to step S623. A print job for which the spooler 304 has been operated is specified based on identification information (Job Id) of the print job.

In step S616, the language monitor 308 determines whether there is a print job corresponding to identification information (Job Id) of the operated print job. If there is a corresponding print job, the language monitor 308 advances the process to step S617; if NO, returns it to step S615.

In step S617, the language monitor 308 determines whether the operation to the spooler 304 is resumed. If the operation to the spooler 304 is resumed, the language monitor 308 advances the process to step S618; if NO, to step S619.

In step S618, the language monitor 308 resumes transmission processing of the print job to the printing apparatus 1500.

In step S619, the language monitor 308 determines whether the operation to the spooler is suspension (stop of transmission) of a print job or deletion of a held print job. If the operation is suspension (stop of transmission) of a print job, the language monitor 308 advances the process to step S620. If the operation is deletion of a print job, the language monitor 308 advances the process to step S621.

In step S620, the language monitor 308 stops transmission processing to the printing apparatus 1500, and returns the process to step S602.

In step S621, the language monitor 308 deletes print data of the print job from held print jobs, and advances the process to step S622.

In step S622, the language monitor 308 determines whether the deleted print job is a print job in process. If the deleted print job is a print job in process, the language monitor 308 ends the process; if NO, returns it to step S615.

In step S623, the language monitor 308 determines whether the print job is complete (printing is complete). By communicating with the printing apparatus 1500, the language monitor 308 acquires information on the status of the printing apparatus 1500 or the processing status of a print job in process, and can determine whether processing of the print job is complete. If processing of the print job is complete, the language monitor 308 advances the process to step S624; if NO, returns it to step S615.

In step S624, the language monitor 308 notifies the spooler 304 of the completion of printing by transmitting information representing that processing of the print job is complete. By this process, the language monitor 308 ends a series of processes. When receiving the printing completion notification, the spooler 304 deletes corresponding print job information from the print queue 305.

(Spooler Operation)

Figure 11:
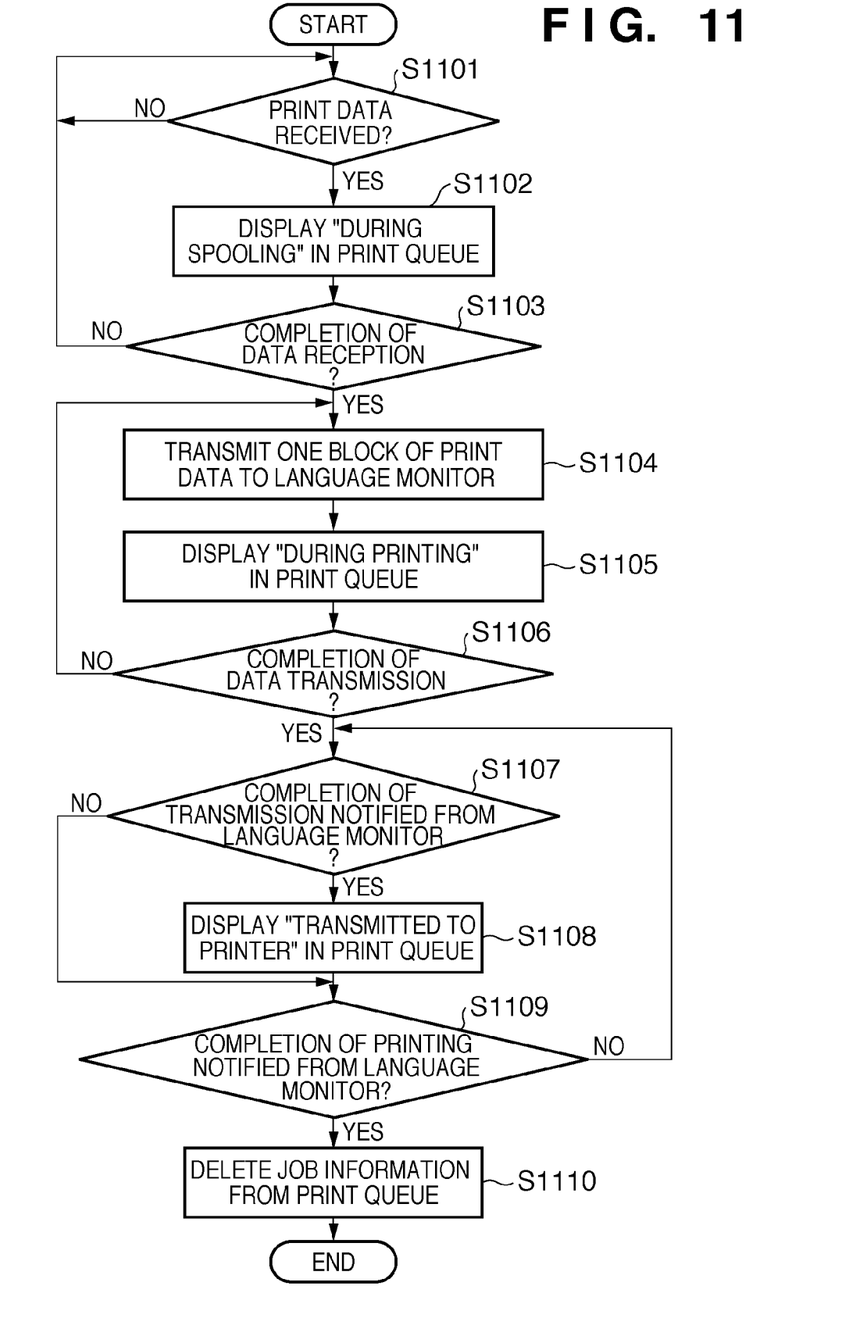
FIG. 11 is a flowchart for explaining the processing sequence of a spooler according to the first embodiment of the present invention.

Processing of the spooler 304 at the start of print processing will be explained with reference to the flowchart of FIG. 11. The spooler 304 executes the processing of this flowchart under overall control of the CPU 1. The flowchart of FIG. 11 explains the operation of the spooler 304, and a description of processing when the user has operated a job will be omitted.

In step S1101, the spooler 304 determines whether it has received a print job (print data) from the printer graphics driver 303 via the GDI 302. If the spooler 304 has received a print job (print data), it advances the process to step S1102. If the spooler 304 has not received a print job (print data), it returns the process to step S1101.

In step S1102, the spooler 304 displays "during spooling" in the print queue 305, and advances the process to step S1103.

In step S1103, the spooler 304 determines whether it has received all print data. If the spooler 304 has received all print data, it advances the process to step S1104. If the spooler 304 determines in step S1103 that it has not received all print data, it returns the process to step S1101. The printer graphics driver 303 notifies the spooler 304 that transmission of all print data is complete. Based on this notification, the spooler 304 can determine whether it has received all print data.

In step S1104, the spooler 304 transmits one block of print data of the print job to the language monitor 308, and advances the process to step S1105.

In step S1105, the spooler 304 displays "during printing" in the print queue 305, and advances the process to step S1106.

In step S1106, the spooler 304 determines whether it has transmitted all print data of the print job. If the spooler 304 has transmitted all print data, it advances the process to step S1107. If the spooler 304 has not transmitted all print data, it returns the process to step S1104.

In step S1107, the spooler 304 determines whether the language monitor 308 has notified the spooler 304 of the completion of transmission. This transmission completion notification corresponds to the process in step S614 of FIG. 6A. If the language monitor 308 has notified the spooler 304 of the completion of transmission, the spooler 304 advances the process to step S1108. In step S1108, the spooler 304 displays "transmitted to the printer" in the print queue 305.

If the spooler 304 has not received the transmission completion notification, it advances the process to step S1109. In step S1109, the spooler 304 determines whether the language monitor 308 has notified the spooler 304 of the completion of printing of the print job (end of the print job). The printing completion notification transmitted from the language monitor 308 corresponds to step S624 in FIG. 6B. If the language monitor 308 has notified the spooler 304 of the completion of printing, the spooler 304 advances the process to step S1110; if NO, returns it to step S1107 to repeat the same processing. In step S1110, the spooler 304 deletes corresponding print job information from the print queue 305, and ends the process.

Even after the spooler 304 transmits a print job, print job information can be displayed, and the operation of a print job can be reflected in print job processing till the completion of print processing by the printing apparatus 1500.

Second Embodiment

The second embodiment will describe a configuration in which information on a print job held by a language monitor 308 is changed from a printer status monitor 309. Before a print job held by the language monitor 308 is transmitted to a printing apparatus 1500, print job information set for the print job such as the copy count can also be changed.

Figure 7:
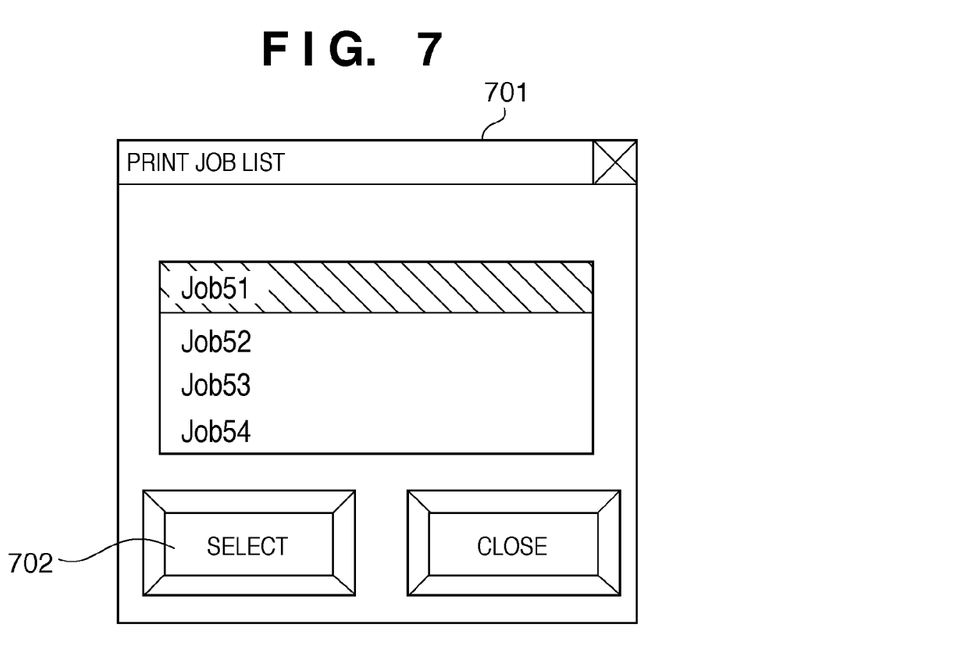
FIG. 7 is a view illustrating a UI window displayed by display control of a status monitor according to the second embodiment of the present invention.

FIG. 7 is a view illustrating a UI window 701 displayed by display control of the printer status monitor 309. The UI window 701 displays a list of print jobs held by the language monitor 308. The user selects a print job whose information is to be changed from print jobs displayed in the list on the UI window 701 (in FIG. 7, Job 51 is selected). By pressing a selection button 702, the selection is finalized.

Figure 8:
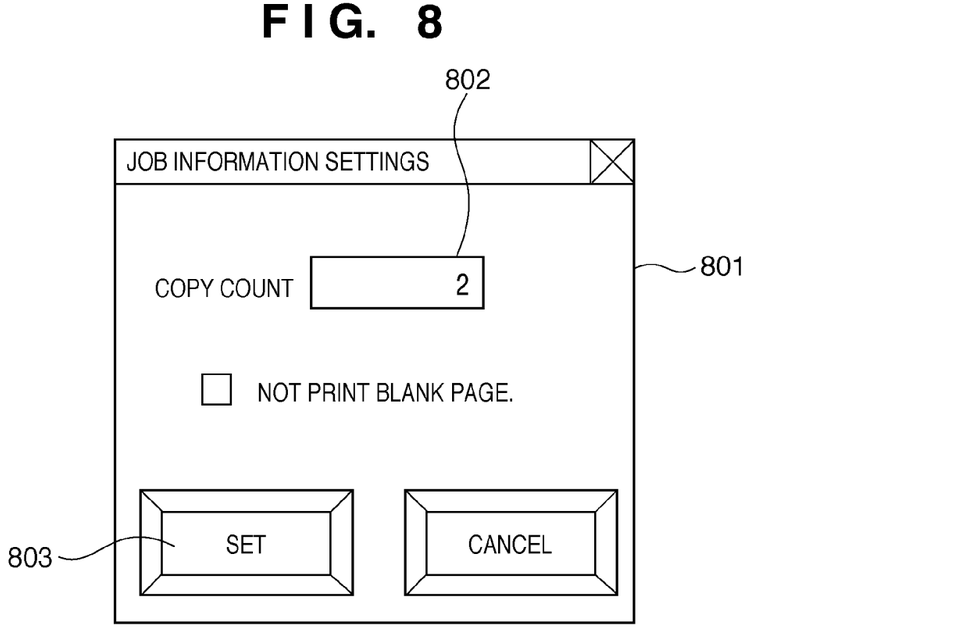
FIG. 8 is a view illustrating a print job information setup window displayed by display control of the status monitor according to the second embodiment of the present invention.

FIG. 8 is a view illustrating a print job information setup window 801 displayed by display control of the printer status monitor 309. The print job information setup window 801 displays a setting field 802 for changing print job information. By pressing a setting button 803, the setting contents are finalized. When accepting the finalization of the setting contents in response to the press of the setting button 803, the printer status monitor 309 designates Job Id, and requests the language monitor 308 to change the settings of the print job information.

Figure 9:
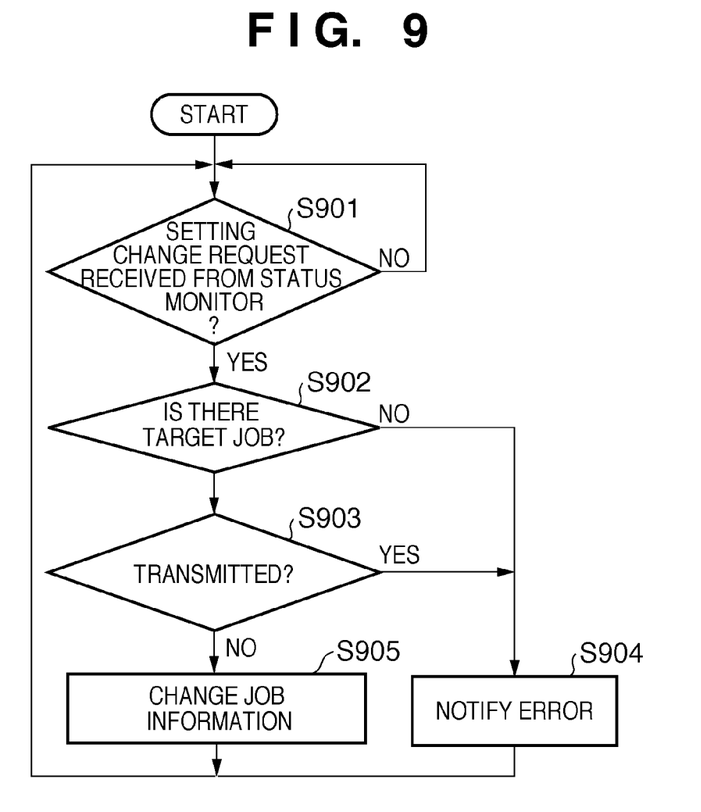
FIG. 9 is a flowchart for explaining the processing sequence of a language monitor which processes a print job information setting change request according to the second embodiment of the present invention.

FIG. 9 is a flowchart for explaining the processing sequence of the language monitor 308 which processes a print job information setting change request. The language monitor 308 executes the processing of this flowchart under overall control of a CPU 1. This processing is performed in parallel with the print processing described in the first embodiment.

In step S901, the language monitor 308 determines whether it has received a print job information change request from the printer status monitor 309.

If the language monitor 308 has not received a setting change request, it returns to step S901 and waits for a setting change request.

If the language monitor 308 has received a print job information setting change request from the printer status monitor 309, it advances the process to step S902. In step S902, the language monitor 308 determines whether it holds a print job whose settings are requested to be changed. The language monitor 308 can determine the presence/absence of a print job by comparing Job Id held as a print job before transmission in the printing apparatus 1500 with Job Id transmitted from the printer status monitor 309.

If the language monitor 308 holds a print job whose settings are requested to be changed, it advances the process to step S903. If the language monitor 308 does not hold a print job whose settings are requested to be changed, it advances the process to step S904.

In step S903, the language monitor 308 determines whether print data of the target print job has been transmitted to the printing apparatus 1500. If the print data has been transmitted to the printing apparatus 1500, the language monitor 308 advances the process to step S904. If the language monitor 308 determines in step S903 that the print data of the target print job has not been transmitted to the printing apparatus 1500, it advances the process to step S905. Whether print data has been transmitted to the printing apparatus 1500 can be determined by determining whether the print data remains in the language monitor 308 as print data to be transmitted.

In step S905, the language monitor 308 changes the print job information on the basis of the request from the printer status monitor 309, and then returns the process to step S901.

Figure 10:
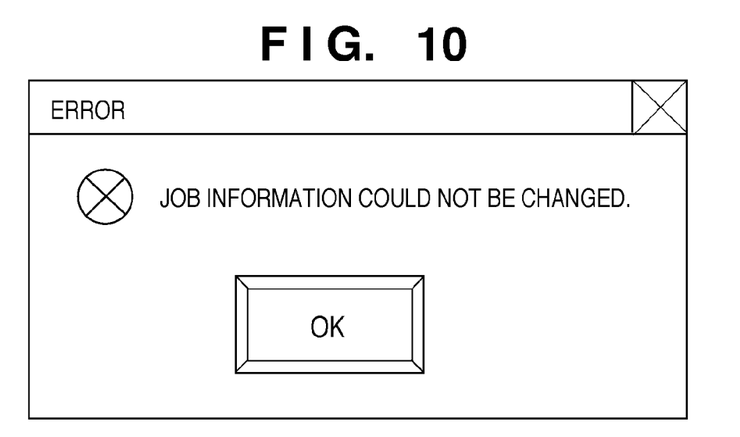
FIG. 10 is a view illustrating a UI window which notifies a failure in changing settings based on a request from the status monitor according to the second embodiment of the present invention.

In step S904, the language monitor 308 notifies the printer status monitor 309 that it could not change the settings on the basis of the request from the printer status monitor 309. Then, the language monitor 308 returns the process to step S901. Upon accepting this notification, the printer status monitor 309 displays an error display in, e.g., a UI window (FIG. 10).

The second embodiment has explained an example of changing the settings of a print job held by the language monitor, but the gist of the present invention is not limited to this example. For example, the present invention is also applicable to a printing apparatus having a configuration in which a print job is held on the printing apparatus side as long as print job information can be acquired/set via the language monitor or the like.

Even after the spooler 304 transmits a print job, the settings of the print job information can be changed until the print job starts.

Other Embodiments

The object of the present invention is also achieved by supplying a computer-readable storage medium which stores software program codes for implementing the functions of the above-described embodiments to a system or apparatus. The object of the present invention is also achieved by reading out and executing the program codes stored in the storage medium by the computer (or the CPU or MPU) of the system or apparatus.

In this case, the program codes read out from the storage medium implement the functions of the above-described embodiments, and the storage medium which stores the program codes constitutes the present invention.

The storage medium for supplying the program codes includes a flexible disk, hard disk, optical disk, magnetooptical disk, CD-ROM, CD-R, nonvolatile memory card, and ROM.

The functions of the above-described embodiments are implemented when the computer executes the readout program codes. Also, the present invention includes a case where an OS (Operating System) or the like running on the computer performs part or all of actual processing on the basis of the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-165313, filed Jun. 22, 2007, which is hereby incorporated by reference herein in its entirety.

What is claimed is:

1. An information processing apparatus comprising:
a display device;
a microprocessor and a memory embodying instructions which when executed on the microprocessor cause the microprocessor to execute:
a display task of displaying information on the display device;
a language monitor task that (i) transmits a print job received from a spooler to a printing apparatus; and
a status monitor task that displays on the display device, a status of the printing apparatus and a processing status of the print job in process,
wherein said status monitor task activates a print queue, which causes to display on the display device a list of a plurality of print jobs and a status of each of the plurality of print jobs in the spooler, to be provided as a module of an operating system, wherein the print queue is provided as a standard function of the operating system,
wherein said language monitor task notifies (ii) a transmission completion to the spooler when said language monitor task has output the print job to the printing apparatus, (iii) the spooler that the print job is in progress when said language monitor task has received information indicating a processing status of the print job from the printing apparatus after outputting the print job to the printing apparatus, and (iv) a printing completion to the spooler when said language monitor task has received the printing completion from the printing apparatus,
wherein the print queue causes to display on the display device, in accordance with a notification of the transmission completion, the status of the print job indicating a transmission to the printing apparatus,
wherein the print queue causes to display on the display device, in accordance with the information indicating the processing status of the print job received from the printing apparatus, the status of the print job indicating that the print job is in progress, and
wherein the print job of the print queue is deleted in accordance with a notification of the printing completion.

2. The apparatus according to claim 1, wherein: the display task displays the list of the plurality of print jobs, which are held by said language monitor task, and
the microprocessor is configured to further execute:
a selection task that selects one print job among the list of the plurality of print jobs displayed by said display task; and
a change task that changes a setting of the one print job selected by said selection task.

3. The apparatus according to claim 1, wherein said status monitor task displays a processing status of the print job held by the language monitor task.

4. An information processing apparatus comprising:
a display device;
a memory embodying instructions which when executed on the microprocessor cause the microprocessor to execute:
a display task of displaying information on the display device;
a language monitor task that (i) transmits a print job received from a spooler to a printing apparatus, and (ii) notifies a printing completion to the spooler when the language monitor task has received the printing completion from the printing apparatus; and
a status monitor task that displays on the display device, a status of the printing apparatus and a processing status of the print job in process,
wherein said status monitor task activates a print queue, which causes to display on the display device a list of a plurality of print jobs and a status of each of the plurality of print jobs in the spooler, to be provided as a module of an operating system, wherein the print queue is provided as a standard function of the operating system,
wherein the print queue causes to display on the display device, until the printing completion is received, the status of the print job indicating that the print job is in progress, and wherein the print job of the print queue is deleted in accordance with a notification of the printing completion.

5. The apparatus according to claim 4, wherein said status monitor task displays a processing status of the print job held by the language monitor task.

6. An information processing method executed in an information processing apparatus having a display device, and a microprocessor configured to execute a display task of displaying information on the display device, a language monitor task that (i) transmits a print job received from a spooler to a printing apparatus, and a status monitor task that displays on the display device, a status of the printing apparatus and a processing status of the print job in process, wherein the status monitor task activates a print queue, which causes to display on the display device a list of a plurality of print jobs and a status of each of the plurality of print jobs in the spooler, to be provided as a module of an operating system, wherein the print queue is provided as a standard function of the operating system, the method comprising the steps of:

causing the language monitor task to notify (ii) a transmission completion to the spooler when the language monitor task has output the print job to the printing apparatus, (iii) the spooler that the print job is in progress when the language monitor task has received information indicating a processing status of the print job from the printing apparatus after outputting the print job to the printing apparatus, and (iv) a printing completion to the spooler when the language monitor task has received the printing completion from the printing apparatus;

causing the print queue to display on the display device, in accordance with a notification of the transmission completion, the status of the print job indicating a transmission to the printing apparatus;

causing the print queue to display on the display device, in accordance with the information indicating the processing status of the print job received from the printing apparatus, the status of the print job indicating that the print job is in progress; and     deleting the print job of the print queue in accordance with a notification of the printing completion.

7. The method according to claim 6, further comprising:

a displaying step of displaying on the display device, the list of the plurality of print jobs, which are held by the language monitor task;

a selecting step of selecting one print job among the list of the plurality of print jobs displayed in the display step; and a changing step of changing a setting of the one print job selected in the selecting step.

8. An information processing method executed in an information processing apparatus having a display device, and a microprocessor configured to execute a display task of displaying information on the display device, a language monitor task that (i) transmits a print job received from a spooler to a printing apparatus, and a status monitor task that displays on the display device, a status of the printing apparatus and a processing status of the print job in process, wherein the status monitor task activates a print queue, which causes to display on the display device a list of a plurality of print jobs and a status of each of the plurality of print jobs in the spooler, to be provided as a module of an operating system, wherein the print queue is provided as a standard function of the operating system, the method comprising the steps of:

causing the language monitor task to (ii) notify a printing completion to the spooler when the language monitor task has received the printing completion from the printing apparatus;

causing the print queue to display on the display device, until the printing completion is received, the status of the print job indicating that the print job is in progress; and     deleting the print job of the print queue in accordance with a notification of the printing completion.

9. A non-transitory computer-readable storage medium storing a computer program for causing an information processing apparatus having a display device, and a microprocessor configured to execute a display task of displaying information on the display device, a language monitor task that (i) transmits a print job received from a spooler to a printing apparatus, and a status monitor task that displays a status of the printing apparatus and a processing status of the print job in process, wherein the status monitor task activates a print queue, which causes to display on the display device a list of a plurality of print jobs and a status of each of the plurality of print jobs in the spooler, to be provided as a module of an operating system, wherein the print queue is provided as a standard function of the operating system, to execute an information processing method, the method comprising the steps of:

causing the language monitor task to (ii) notify a printing completion to the spooler when the language monitor task has received the printing completion from the printing apparatus;

causing the print queue to display on the display device, until the printing completion is received, the status of the print job indicating that the print job is in progress; and     deleting the print job of the print queue in accordance with a notification of the printing completion.

* * * * *